No. 693,746. Patented Feb. 18, 1902.
E. SHAW.
DISH WASHING MACHINE.
(Application filed Sept. 7, 1901.)
(No Model.)
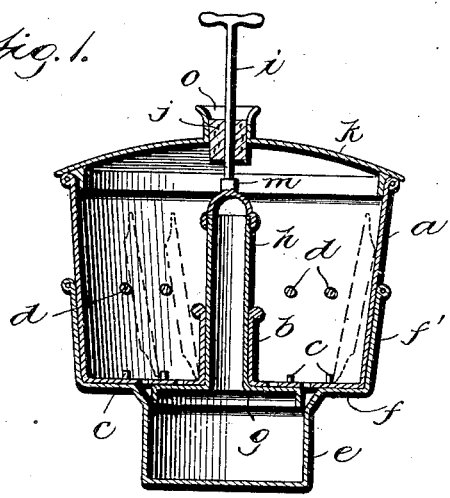
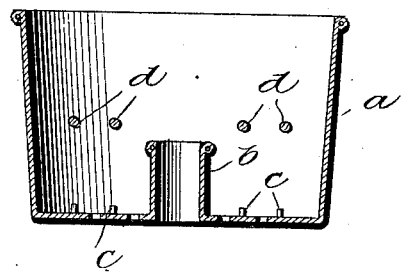
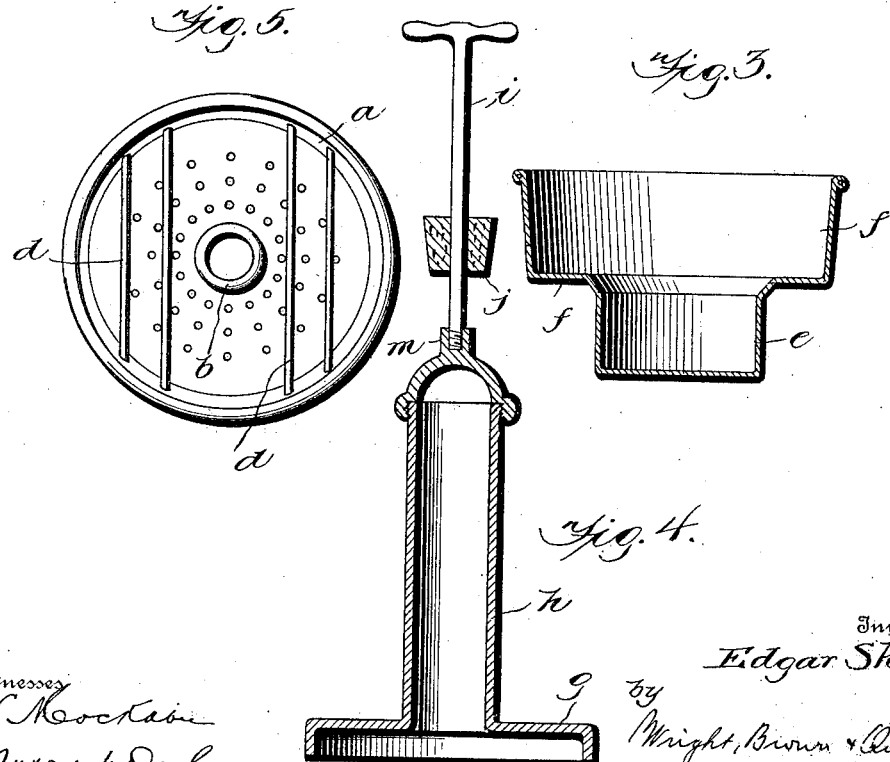
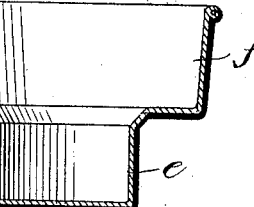
Witnesses:
Inventor
Edgar Shaw
by
Wright, Brown & Quinby
Attorneys
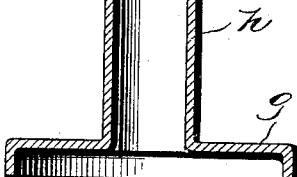
THE NORRIS PETERS CO., PHOTO-LITHO., WASHINGTON, D. C.

UNITED STATES PATENT OFFICE.

EDGAR SHAW, OF SWAMPSCOTT, MASSACHUSETTS.

DISH-WASHING MACHINE.

SPECIFICATION forming part of Letters Patent No. 693,746, dated February 18, 1902.

Application filed September 7, 1901. Serial No. 74,652. (No model.)

*To all whom it may concern:*

Be it known that I, EDGAR SHAW, of Swampscott, in the county of Essex and State of Massachusetts, have invented certain new and useful Improvements in Dish-Washing Machines, of which the following is a specification.

This invention has for its object to provide a compact, simple, and efficient dish-washing machine adapted to contain the dishes to be washed and a supply of hot water below the same and to raise the hot water above the dishes and discharge it downwardly thereupon without contact between the operator's hands and the dish-water, so that boiling water may be employed and all the objections due to the immersion of the hands in the dish-water avoided.

The invention consists in the improvements which I will now proceed to describe and claim.

Of the accompanying drawings, forming a part of this specification, Figure 1 represents a sectional view of a dish-washing machine embodying my invention. Figs. 2 and 3 represent sectional views of the dish-holding pan and the water-holding pan or cylinder disconnected. Fig. 4 represents a sectional view of the piston and its tubular rod. Fig. 5 represents a top view of the dish-receiving pan with its cover removed.

The same reference characters indicate the same parts in all the figures.

In the drawings, $a$ represents a dish-receiving pan, preferably of circular form and having a substantially flat bottom, which is perforated to permit water to flow from the pan into the pan-supporting cylinder hereinafter described. The bottom of the pan has a central opening, which is surrounded by a tubular guide $b$, affixed to the bottom of the pan and extending vertically above the bottom. The pan is provided with means for holding a suitable number of dishes on edge and keeping them suitably separated, so that they will not nest together, said means comprising a series of upwardly-projecting ears or lugs $c$ on the bottom of the pan and horizontal rods $d$ extending across the pan above the bottom. The lower edges of the dishes bear against the lugs $c$, and their upper portions bear against the rods $d$, the lugs preventing the lower edges of the dishes from slipping laterally and nesting together, so that water cannot flow freely between them.

$e$ represents a cylinder or cylindrical tub which is of uniform diameter from top to bottom, so that it coöperates with the piston, hereinafter described, in raising water. The upper end of the cylinder $e$ is provided with a seat for the pan $a$, said seat comprising a horizontal flange $f$, surrounding the cylinder and having an upwardly-projecting extension $f'$ formed to inclose the lower portion of the pan-body $a$, the bottom of the said pan $a$ resting on the horizontal flange $f$.

The parts $e, f$, and $f'$ constitute a combined water-holding pan and receiver for the dish-holding pan and the piston.

$g$ represents a piston having an easy sliding fit in the cylinder. To the piston is affixed a tubular piston-rod $h$, which extends through the guide $b$ and has a sliding fit therein. The tubular rod $h$ is open from end to end and constitutes a conduit adapted to conduct water from the cylinder $e$ to the upper portion of the pan $a$ when the piston is moved forcibly downward in the cylinder. To the upper end of the piston-rod is detachably secured a handle $i$, which extends through a handle-guide $j$ in the cover $k$ of the pan, said handle-guide being alined with the piston-rod guide. The handle is composed of a rod having a suitable handhold at its upper end, its lower end being detachably engaged by a screw-thread or other connection with a cross-bar or socket $m$, affixed to the upper end of the tubular piston-rod. The handle-guide $j$ is preferably a plug of cork or other suitable compressible material having a longitudinal aperture in which the handle-rod has a sliding fit and contained in a socket or holder $o$, affixed to the cover $k$. Said socket surrounds a guide-receiving opening in the cover and extends above the latter, its upper end being preferably enlarged to form a basin surrounding the upper end of the guide $j$ and adapted to catch any small quantity of water that may find its way to the upper portion of the guide. The compressibility of the guide $j$, however, gives it a practically water-tight fit on the rod $i$ and in the socket $o$, so that there is little liability of leakage of water through or around it.

The described appliance may be operated as follows: A suitable quantity of hot water, with or without soap, being placed in the cylinder, (three quarts being sufficient for the dishes ordinarily used at one meal by a family of about six persons,) the pan $a$, with the dishes to be washed arranged edgewise therein, is placed in the seat surrounding the cylinder $e$. The cover $k$ is then placed on the pan and the handle-guide $j$, with the handle therein, is inserted in the socket $o$, the handle being then screwed into the socket $m$ on the tubular piston-rod. The piston is now moved forcibly downward and forces a considerable proportion of the water from the cylinder upwardly through the tubular rod $h$. The water thus forced upwardly impinges against the cover $k$ and falls therefrom upon the dishes and returns through the perforated bottom of the pan to the cylinder. This operation may be repeated until the dishes have been sufficiently washed, after which the pan may be removed from the cylinder, the dirty dish-water poured from the latter, the pan replaced on the cylinder, the cover removed from the pan, and clean boiling water poured over the dishes to rinse and finally heat them, so that they will not require wiping. The hot rinsing-water accumulates in the cylinder and may be subsequently used for washing kettles and other utensils which cannot be placed in the pan $a$, the latter being removed from the cylinder.

It is to be understood that in practice the piston $g$ has such an easy sliding fit, as above mentioned, in the cylinder that when the said piston is elevated somewhat slowly the water that is above it will escape into the cylinder or well $e$ around the edges of said piston. The force with which the water will rush from the upper end of the tubular rod $h$ will depend upon the speed with which the said tubular rod and the piston are forced downward. The action to raise the water is facilitated by the inverted-cup shape of the piston. By simply raising the rod $h$ and the piston somewhat slowly the water will pass downward around the edge of the piston.

It is evident that if the cylinder contains three quarts of water and if two-thirds of this quantity is discharged upon the dishes at each downward stroke of the piston about forty quarts can be discharged by twenty full strokes of the piston, this volume of water being sufficient to thoroughly clean the dishes.

It will be seen that dishes washed with this machine are much less liable to be chipped, cracked, or broken than when washed by hand.

Should it be desired to give the dishes a second washing with fresh clean water, the pan $a$, with the dishes contained therein, and the cover $k$ and the piston $g$ and its tubular rod $h$ may all be lifted and removed together either by grasping the sides of the pan or by means of the handle $i$. This will leave all the dirty water in the cylinder or well of the water-holding pan, which can be readily emptied and refilled with fresh hot water. Upon replacing the pan $a$ and the parts carried thereby and the dishes the operation may be proceeded with, as before.

I claim—

1. A dish-washer comprising a dish-holding pan and a water-holding pan separable from each other, and means for forcing water from the latter up into the former and connected with the dish-holding pan so as to be removed with it from the water-holding pan.

2. A dish-washer comprising a dish-holding pan and a water-holding pan separable from each other, the latter having a cylindrical depression or well, a piston adapted to reciprocate in said well, and a hollow piston rod or tube extending from said piston into the dish-holding pan, means being provided whereby raising the dish-holding pan will carry with it the said piston and tube.

3. A dish-washer comprising a lower pan having a cylindrical depression or well for water, an upper pan adapted to removably fit and be supported by the lower pan and having a perforated bottom and means for supporting dishes, a hollow rod or tube extending through said bottom and having a piston adapted to work in said well, a cover for the upper pan, and means extending through the cover for reciprocating the piston, the said piston and its operating means being supported so as to be removed with the upper pan.

4. A dish-washer comprising a water-holding pan having a cylindrical well or depression, a dish-receiving pan removably fitted in the water-holding pan and having a central opening in its bottom, a piston-rod guide surrounding said opening, a cover fitted to the upper pan and having a central opening surrounded by a socket, a piston adapted to reciprocate in the well of the lower pan and having a hollow piston-rod fitted to said guide, a handle extending from said piston-rod up through the opening of the cover, and a compressible handle-guide inserted in the socket of the cover and longitudinally apertured to receive and guide the handle.

5. A dish-washer comprising a liquid-holding cylinder having at its upper end a pan-receiving seat, a dish-receiving pan formed at its lower portion to fit the said seat, and having a piston-rod guide in its bottom, a cover for said pan having a handle-guide alined with said piston-rod guide, a piston having a sliding fit in said cylinder, and a tubular piston-rod having a sliding fit in the piston-rod guide and provided with a handle having a sliding fit in said handle-guide, the said tubular rod forming a conduit extending through the piston and adapted to conduct water from the cylinder to the upper portion of the pan.

In testimony whereof I have affixed my signature in presence of two witnesses.

EDGAR SHAW.

Witnesses:
C. F. BROWN,
E. BATCHELDER.